(12) United States Patent
Gowda et al.

(10) Patent No.: US 8,166,187 B2
(45) Date of Patent: Apr. 24, 2012

(54) DISTRIBUTED IP GATEWAY BASED ON SHARING A MAC ADDRESS AND IP ADDRESS CONCURRENTLY BETWEEN A FIRST NETWORK SWITCHING DEVICE AND A SECOND NETWORK SWITCHING DEVICE

(75) Inventors: Naveen Pethandlahally Narayan Gowda, Karnataka (IN); Srinivas Sastry, Bangalore (IN); Ramkumar Sankar, Bangalore (IN); Kiron Haltore, San Jose, CA (US); Murali Basavaiah, Sunnyvale, CA (US); Sameer Merchant, San Jose, CA (US); Sreeram Parameswara Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 300 days.

(21) Appl. No.: 12/403,337

(22) Filed: Mar. 12, 2009

(65) Prior Publication Data

US 2010/0189117 A1    Jul. 29, 2010

(30) Foreign Application Priority Data

Feb. 28, 2009    (IN) .............................. 157/DEL/2009

(51) Int. Cl.
*H04L 12/37* (2006.01)
(52) U.S. Cl. ........ 709/230; 370/401; 370/219; 370/469; 709/203; 709/225
(58) Field of Classification Search .................. 709/230, 709/203, 225; 370/401
See application file for complete search history.

(56) References Cited

U.S. PATENT DOCUMENTS

| | | | | |
|---|---|---|---|---|
| 6,104,870 | A  * | 8/2000 | Frick et al. ...................... | 703/27 |
| 7,006,431 | B1 * | 2/2006 | Kanekar et al. ................ | 370/217 |
| 7,440,754 | B2 * | 10/2008 | Bahl et al. ................... | 455/432.1 |
| 7,463,579 | B2 * | 12/2008 | Lapuh et al. ................... | 370/216 |
| 7,656,788 | B2 * | 2/2010 | Ma et al. ....................... | 370/219 |
| 7,693,976 | B2 * | 4/2010 | Perry et al. ..................... | 709/223 |
| 7,881,208 | B1 * | 2/2011 | Nosella et al. ................ | 370/242 |

(Continued)

OTHER PUBLICATIONS

CiscoBlog: HSRP vs. VSRP vs. GLBP, Published Apr. 15, 2006, [online] [retrieved on Jan. 8, 2009]. Retrieved from the Internet: <URL: http://www.ciscoblog.com/archives/2006/04/hsrp_vs_vrrp_vs.html>, pp. 1-4.

(Continued)

*Primary Examiner* — Wing Chan
*Assistant Examiner* — Tesfay Yohannes
(74) *Attorney, Agent, or Firm* — Fish & Richardson P.C.

(57) ABSTRACT

In one embodiment, a method comprises assigning, by a distributed gateway protocol circuit in a first network switching device, a shared Media Access Control (MAC) address to a shared Internet Protocol (IP) address, the shared MAC address and the shared IP address enabling connected network devices to reach a distributed IP gateway in a network; and sending, by a layer 2 forwarding circuit in the first network switching device, an instruction via a peer data link to a peer layer 2 forwarding circuit in a second network switching device in response to the distributed gateway protocol circuit claiming active control of the distributed IP gateway, the instruction enabling the second network switching device to operate as part of the distributed IP gateway based on concurrent use of the shared MAC address and the shared IP address by the first network switching device and the second network switching device.

23 Claims, 9 Drawing Sheets

U.S. PATENT DOCUMENTS

| | | | | |
|---|---|---|---|---|
| 2002/0165961 A1* | 11/2002 | Everdell et al. | | 709/225 |
| 2003/0126195 A1* | 7/2003 | Reynolds et al. | | 709/203 |
| 2003/0177176 A1* | 9/2003 | Hirschfeld et al. | | 709/203 |
| 2004/0202126 A1* | 10/2004 | Leung et al. | | 370/331 |
| 2005/0141499 A1* | 6/2005 | Ma et al. | | 370/389 |
| 2006/0129491 A1* | 6/2006 | Eun et al. | | 705/51 |
| 2007/0115992 A1* | 5/2007 | Weinstock et al. | | 370/392 |
| 2008/0181226 A1* | 7/2008 | Varier et al. | | 370/390 |
| 2009/0034539 A1* | 2/2009 | Kawai et al. | | 370/400 |
| 2009/0201909 A1* | 8/2009 | Bou-Diab et al. | | 370/351 |

OTHER PUBLICATIONS

"Configuring GLBP", Cisco Systems, Inc., Published Sep. 23, 2005, [online] [retrieved on Jan. 8, 2009]. Retrieved from the Internet: <URL: http://www.ciscoblog.com/docstore/haipglbp.pdf>, pp. 1-26.

"Configuring HSRP", Cisco Systems, Inc., Published May 2, 2005, [online] [retrieved on Jan. 8, 2009]. Retrieved from the Internet: <URL: http://www.ciscoblog.com/docstore/haiphsrp.pdf>, pp. 1-48.

"Configuring VRRP", Cisco Systems, Inc., Published May 2, 2005 [online] [retrieved on Jan. 8, 2009]. Retrieved from the Internet: <URL: http://www.ciscoblog.com/docstore/haipvrrp.pdf>, pp. 1-26.

"Nortel Layer 2/3 Gigabit Ethernet Switch Modules for IBM BladeCenter", Published 2006, [online] [retrieved on Dec. 9, 2008]. Retrieved from the Internet: <URL: http://www.bladenetwork.net/media/PDFs/IBM_GbE_L2-3_Solutions.pdf>, pp. 1-4.

Nortel Ethernet Routing Switch 8600, "Configuration—Link Agregation, MLT, and SMLT", Release: 5.0, Published May 30, 2008, [online] [retrieved on Dec. 9, 2008], Retrieved from the Internet: <URL: http://www142.nortelnetworks.com/techdocs/ERS8600_5_0/pdf/NN46205-518_01.01_CFG.pdf>, 141 pages.

At A Glance, "Cisco Catalyst 6500: Virtual Switching System 1440", Cisco Systems, Inc., Published Aug. 2007, [online] [retrieved on Jan. 9, 2009]. Retrieved from the Internet: <URL: http://www.cisco.com/en/US/prod/collateral/switches/ps5718/ps9336/product_at_a_glance0900aecd806ee2d4.pdf>, 1 page.

Li et al., "Cisco Hot Standby Router Protocol (HSRP)", Network Working Group, Request for Comments: 2281, Mar. 1998, pp. 1-17.

Hinden, "Virtual Router Redundancy Protocol (VRRP)", Network Working Group, Request for Comments: 3768, Apr. 2004, pp. 1-27.

White Paper, "Cisco Catalyst 6500 Series Virtual Switching System (VSS) 1440", Cisco Systems, Inc., Published Dec. 2007, [online] [retrieved on Jan. 9, 2009]. Retrieved from the Internet: <URL: http://www.cisco.com/en/US/prod/collateral/switches/ps5718/ps9336/white_paper_c11_429338.pdf>, pp. 1-79.

Wikipedia, "EtherChannel" Published Nov. 6, 2008, [online], [retrieved Dec. 9, 2008]. Retrieved from the Internet: <URL: http://en.wikipedia.org/w/index.php?title=EtherChannel&printable=yes>, pp. 1-4.

* cited by examiner

DISTRIBUTED IP GATEWAY BASED ON SHARING A MAC ADDRESS AND IP ADDRESS CONCURRENTLY BETWEEN A FIRST NETWORK SWITCHING DEVICE AND A SECOND NETWORK SWITCHING DEVICE

TECHNICAL FIELD

The present disclosure generally relates to implementing a distributed Internet Protocol (IP) gateway by network switching devices sharing a Media Access Control (MAC) address.

BACKGROUND

Ether Channel is an Ethernet technology described in the Institute for Electrical and Electronic Engineers (IEEE) specification IEEE 802.3ad. Ether Channel aggregates multiple point-to-point physical ports into a single logical port. Ether Channel provides load balancing of different data flows across different physical data links, achieving higher aggregate bandwidth. Ether Channel also provides link level resiliency, where the use of multiple physical data links enables continued data flows across a logical link even if one of the physical data links encounters a failure. However, Ether Channel technology is limited only between two physical devices.

A multi-chassis Ether Channel (MCEC) interface can span more than one physical switch, where physical data links that are physically connected to different switching device chassis can be viewed as a single Ether Channel. An example MCEC-based switching system is the commercially available Cisco Catalyst 6500 Series Virtual Switching System 1440 from Cisco Systems, San Jose Calif.

First hop redundancy protocols (FHRP) can provide default gateway redundancy for host network devices, where two or more router devices negotiate to identify one router as a single active gateway device, and a second router as single standby gateway device. Example FHRP protocols include the Hot Standby Router Protocol (HSRP) described in the Internet Engineering Task Force (IETF) Request for Comments (RFC) 2281, the Virtual Router Redundancy Protocol (VRRP) described in the IETF RFC 3768, and the Gateway Load-Balancing Protocol (GLBP) that is commercially available from Cisco Systems, San Jose Calif.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises assigning, by a distributed gateway protocol circuit in a first network switching device, a shared Media Access Control (MAC) address to a shared Internet Protocol (IP) address, the shared MAC address and the shared IP address enabling connected network devices to reach a distributed IP gateway in a network; and sending, by a layer 2 forwarding circuit in the first network switching device, an instruction via a peer data link to a peer layer 2 forwarding circuit in a second network switching device in response to the distributed gateway protocol circuit claiming active control of the distributed IP gateway, the instruction enabling the second network switching device to operate as part of the distributed IP gateway based on concurrent use of the shared MAC address and the shared IP address by the first network switching device and the second network switching device.

In another embodiment, an apparatus comprises a distributed gateway protocol circuit configured for assigning a shared Media Access Control (MAC) address to a shared Internet Protocol (IP) address. The shared MAC address and the shared IP address enabling connected network devices to reach a distributed IP gateway in a network. The distributed gateway protocol circuit also is configured for selectively claiming active control of the distributed IP gateway. The apparatus further comprises one or more network interface circuits having a plurality of network switch port circuits. Each network switch port circuit is configured for establishing a corresponding data link with one of the connected network devices, or a connected network switching device. The apparatus further comprises a layer 2 forwarding circuit configured for sending an instruction to the connected network switching device via the corresponding data link in response to the distributed gateway protocol circuit claiming the active control of the distributed IP gateway. The instruction enables the connected network switching device to operate as part of the distributed IP gateway based on concurrent use of the shared MAC address and the shared IP address by the apparatus and the connected network switching device.

In yet another embodiment, an apparatus comprises a distributed gateway protocol circuit configured for establishing a distributed IP gateway with a connected network switching device according to a prescribed protocol. The distributed IP gateway has a shared Media Access Control (MAC) address and a shared Internet Protocol (IP) address that enables network devices connected to the apparatus to reach the distributed IP gateway in a network. The distributed gateway protocol circuit also is configured for selectively claiming active control of the distributed IP gateway according to a prescribed protocol. The apparatus also comprises one or more network interface circuits having a plurality of network switch port circuits. Each network switch port circuit is configured for establishing a corresponding data link with one of the connected network devices, or a connected network switching device. The apparatus also comprises a layer 2 forwarding circuit configured for receiving an instruction from the connected network switching device via the corresponding data link. The instruction specifies the shared MAC address to be used for reaching the distributed IP gateway based on the connected network switching device having claimed the active control of the distributed IP gateway. The instruction enables the apparatus to operate as part of the distributed IP gateway based on concurrent use of the shared MAC address and the shared IP address by the apparatus and the connected network switching device.

DETAILED DESCRIPTION

Particular embodiments enable two network switching devices to establish a distributed Internet Protocol (IP) gateway in a network, based on concurrent use by the two network switching devices of a shared layer 2 Media Access Control (MAC) address and a shared IP address. Hence, network devices in the network, for example host network devices, etc., can reach the distributed IP gateway using the shared MAC address in the shared IP address, where any one of the two network switching devices receiving a packet destined for the shared MAC address and the shared IP address can perform layer 3 switching of the packet to a prescribed gateway.

Prior use of FHRP based gateway redundancy between two or more network devices (e.g., network switch devices or router devices) required that only the FHRP active switch could use an assigned MAC address (also referred to as a "virtual MAC" (VMAC) address); hence any other FHRP network devices in standby or listen state could not perform direct layer 3 forwarding of any data packets received from hosts, because those FHRP network devices in standby or listen state could not use the same virtual MAC address. Hence, a data packet received by an FHRP network device in standby or listen state either had to be layer 2 switched to the FHRP active switch, or the data packet had to be dropped based on the topology. The FHRP "active" switch described above refers to the network switch device or router device that had a particular VMAC address in an "active" or "forwarding" state. In the case of GLBP, while both the GLBP active switch the GLBP standby switch could forward traffic for the same shared IP address, the GLBP active switch and the GLBP standby switch required distinct VMAC addresses, and could not use the same VMAC address.

The particular embodiments enable the two network switching devices to establish the distributed IP gateway, both network switching devices concurrently using the shared MAC address (also referred to as the VMAC address) and the shared IP address (also referred to as the virtual IP (VIP) address), based on enabling the combined use of FHRP and multiple data link channels in the two network switching devices. As described below, a first network switching device that has completed claiming active control of the distributed IP gateway (e.g., the active state) sends an instruction via a peer data link to the second network switching device specifying the shared MAC address, based on the shared MAC address being assigned to a layer 2 virtual LAN (VLAN) group that is configured for multichannel link layer communications, where a multichannel link layer communication is established by two or more data links establishing a multiple data link channel. Hence, the second network switching device can perform layer 3 forwarding of received data packets, and even though the second network switching device is within a standby or listen state for the distributed IP gateway. The layer 3 forwarding of received data packets by the second network switching device in the standby/listen state minimizes use of the peer data link between the first and second network switching devices, thereby increasing the total available bandwidth of the distributed IP gateway. Synchronization between the two network switching devices also ensures that failover mechanisms can be implemented in response to detect its failures, minimizing data loss.

Figure 1:
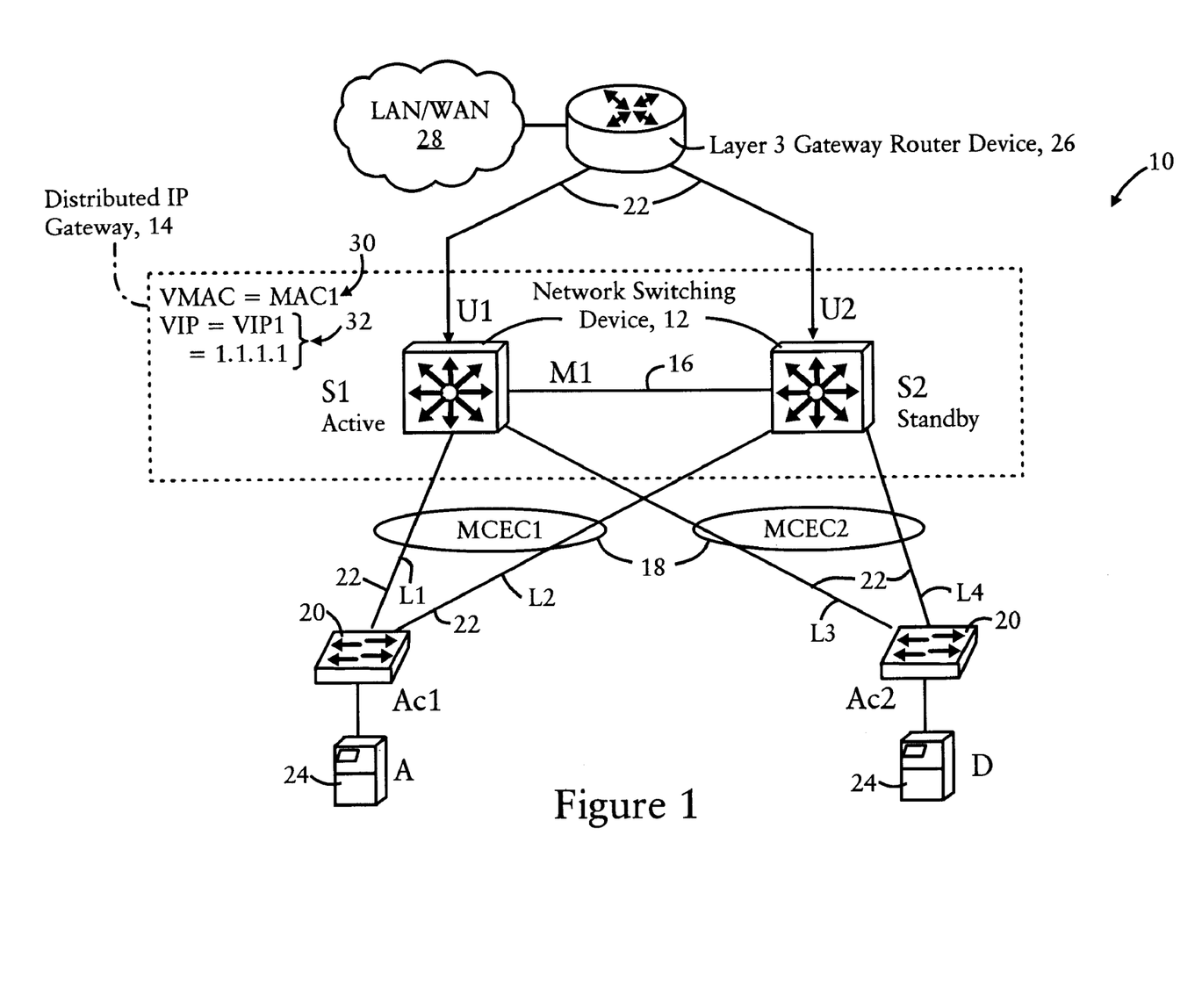
FIG. 1 illustrates an example network having first and second network switching devices configured for providing a distributed IP gateway according to an FHRP-based protocol in combination with providing multiple data link channel connectivity, based on the first and second network switching devices concurrently sharing a shared IP address and a shared MAC address, according to an example embodiment.

FIG. 1 illustrates an example IP-based network 10 having network switching devices 12 configured for establishing a distributed IP gateway 14, according to an example embodiment. The network switching devices 12 are configured for exchanging multiple data link channel control messages via one or more peer data links (M1) 16 for establishment of the multiple data link channel connections 18 with connected network devices 20. The peer data link 16 can be implemented, for example, as an Ether channel interface having one or more 10 Gigabit (Gb) Ethernet links between the two network switching devices "S1" and "S2" 12. Concurrent use of multiple peer data links 16 between the network switching devices "S1" and "S2" 12 can be referred to as a "Virtual Port Channel" (vPC) trunk, or a "Multichannel Trunk" (MCT).

Each network switching device 12 also is configured for establishing multiple data link channel connections 18 with layer 2 access switch devices 20 or other layer 2 switching devices that provide redundant data link connections 22 for host devices 24. Each multiple data link channel connection 18 can be referred to as a "Virtual Port Channel" (vPC) link or an MCEC link. Each layer 2 access switch device 20 also can implement load balancing between the connected links (e.g., L1 and L2 by access switch device "Ac1", L3 and L4 by access switch device "Ac2"). Each multiple data link channel connection 18 can be implemented, for example, using one or more 10 Gb Ethernet links 22. Any one vPC or MCEC connection 18 (e.g., implemented by links "L1" and "L2" 22) also can be terminated by a dual-homed end host device (or some other multi-homed network device) instead of an layer 2 access switch device 20.

Each network switching device 12 also is configured for establishing at least one data connection 22 with at least one layer 3 gateway router device 26 that can provide access to a local area network (LAN) and/or a wide area network (WAN) 28 such as the Internet. Although FIG. 1 illustrates the network switching devices 12 as connected to a single layer 3 gateway router device 26 via the respective data connections (U1 and U2) 22 (also referred to as uplink connections), the uplink connections (U1 and U2) 22 also can connect the network switching devices S1 and S2 12 to respective gateway router devices 26.

As described below, the network switching devices S1 and S2 12 are configured for establishing the distributed IP gateway 14 according to a prescribed FHRP protocol (e.g., HSRP, VRRP, or GLBP), based on concurrent use of a shared MAC address 30 and a shared IP address 32 by each of the network switching devices 12.

Figure 2:
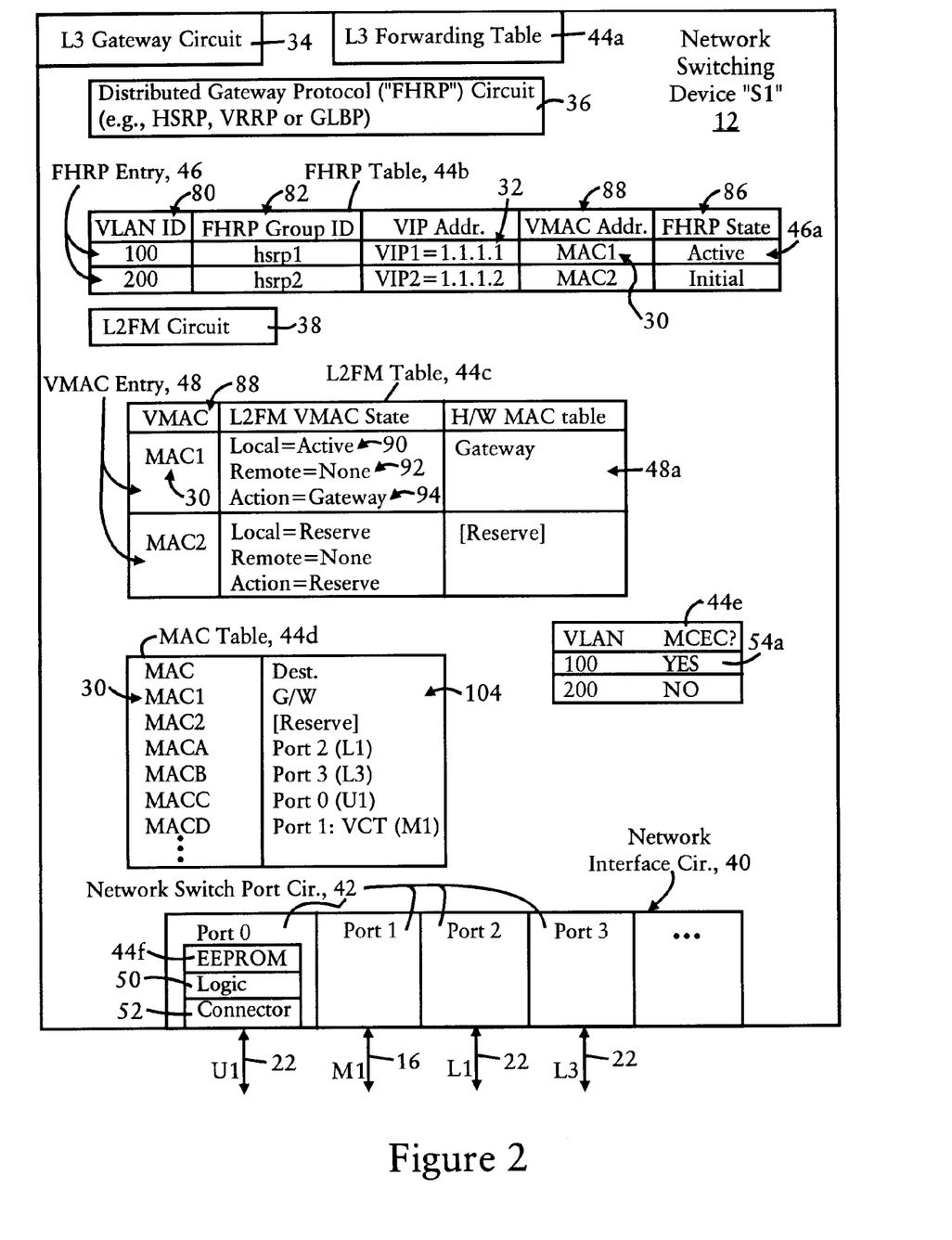
FIG. 2 illustrates an example network switching device from the network of FIG. 1, according to an example embodiment.

FIG. 2 illustrates an example network switching device 12 (e.g., "S1"), according to an example embodiment. The peer network switching device ("S2") 12 has the same configuration except for stored parameters as described below. The apparatus 12 is a physical machine (i.e., a hardware device) configured for implementing network communications with other physical machines via the network 10. Hence, the apparatus 12 is a network-enabled machine implementing network communications within the network 10. The network switching device 12 can be implemented, for example, using a commercially available Cisco Nexus 7000 series modular switching system that is modified as described herein.

As illustrated in FIG. 2, the network switching device (e.g., "S1") 12 includes a layer 3 gateway circuit 34, a distributed gateway protocol circuit 36, a layer 2 forwarding circuit (also referred to as a "L2FM" circuit) 38, and one or more network interface circuits 40 having a plurality of network switch port circuits 42. The apparatus 12 of FIG. 2 also includes one or more memory circuits 44, illustrated for example as including a layer 3 forwarding table 44a, a distributed gateway protocol table ("FHRP Table") 44b, a layer 2 state table ("L2FM Table") 44c, a layer 2 forwarding table ("MAC table") 44d, a VLAN table 44e, and a network switch port EEPROM 44f. As described below, the network switch port EEPROM 44f is configured for storing port-specific configuration data associated with the corresponding network switch port circuit 42.

The layer 3 gateway circuit 34 is configured for performing layer 3 forwarding of data packets based on accessing the layer 3 forwarding table 44a. The distributed gateway protocol circuit 36 is configured for adding and/or modifying entries 46 in the FHRP table 44b based on execution of a prescribed first hop redundancy protocol (FHRP) (e.g., HSRP, VRRP, or GLBP), described below. The layer 2 forwarding circuit 38 is configured for adding and/or modifying layer 2 state table entries 48 in the L2FM table 44c, described below. The distributed gateway protocol circuit 36 and/or the L2FM circuit 38 also can be configured for updating the VLAN table 44e, described below. The MAC table 44d can be updated based on MAC address learning, based on layer 2 data packets that are received by any one of the network switch port circuits 42. The MAC table 44d also can be updated or modified by the L2FM circuit 38.

Each network switch port circuit 42 is implemented in hardware and configured for establishing a corresponding data link with either one of the connected network devices (e.g., 20 or 26 of FIG. 1) or another connected network switching device 12 operating as a peer (e.g., "S2"). For example, the network switch port circuits "0", "1", "2", and "3" of the network switching device "S1" 12 establish data links "U1" 22, "M1" 16, "L1" 22, and "L3" 22 with the layer 3 gateway device 26, the peer network switching device "S2" 12, the access switch device "Ac1" 20, and the access switch device "Ac2" 20, respectively. Each network switch port circuit 42 includes a corresponding EEPROM 44f for storage of port-specific layer 2 configuration data (e.g., MAC address, data transfer rate, flow control parameters, etc.), executable logic 50 configured for executing layer 2 (link layer) operations for the corresponding data link 22 or 16 including transmission and reception of layer 2 data packets, and optionally at least one network connector 52 for physically connecting a network cable to the corresponding network switch port circuit 42 for wired connections (the connector 52 can be omitted in the case of wireless link layer connections by the network switch port circuit 42).

The network switching device 12 can be implemented in various forms. One example implementation of the network switching device 12 can include a multi-slot physical chassis and one or more one or more network line cards connected to (e.g., mounted within) the multi-slot physical chassis.

In one example embodiment, the network switching device 12 illustrated in FIG. 2 can be implemented as a single line card that is inserted within the multi-slot physical chassis; alternatively, the network switching device 12 can be implemented as a standalone apparatus without the necessity of a multi-slot chassis. In this example embodiment, the memory circuits 44a-44f can be implemented within a single integrated memory circuit, if preferred.

In another example embodiment, the network switching device 12 can be implemented as including the multi-slot physical chassis with multiple network line cards, where one of the line cards (referred to for example as a "supervisor card" or "controller card") can include the layer 3 gateway circuit 34, the distributed gateway protocol circuit 36, the layer 2 forwarding circuit 38, and/or the associated memory circuits 44a, 44b, 44c, 44d and 44e. In this example embodiment, the supervisor card also can include the network switch port circuit "Port 1" 42 that establishes the connection "M1" 16 with the peer network switching device, and/or the network switch port circuit "Port 0" that establishes the uplink connection "U1" 22 with the default layer 3 gateway device 26. In this example embodiment, the remaining network switch port circuits for the connected network devices 20 can be implemented on one or more additional line cards connected within the multi-slot chassis. The memory circuits 44a-44e can be implemented on the supervisor line card using one or more integrated memory circuits.

Any of the disclosed circuits of the network switching devices 12 (including the circuits 34, 36, 38, and 44) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as one or more microprocessor circuits implemented on respective one or more integrated microprocessor devices (not shown), where execution of executable code stored in an internal memory circuit causes the one or more microprocessor circuits to store application state variables in microprocessor memory, creating an executable application resource (e.g., an application instance) that performs the operations of the circuit as described herein. Hence, use of the term "circuit" in this specification can refer to a hardware-based circuit that includes logic for performing the described operations, and/or a software-based circuit that includes a reserved portion of microprocessor memory (either integrated within the integrated microprocessor device or locally accessible by the microprocessor device) for storage of application state data and application variables that are modified by execution of the executable code by a microprocessor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed network interface circuit 40 (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 44 can be implemented dynamically by a microprocessor circuit, for example based on memory address assignment and partitioning executed by the microprocessor circuit.

Figure 3A:
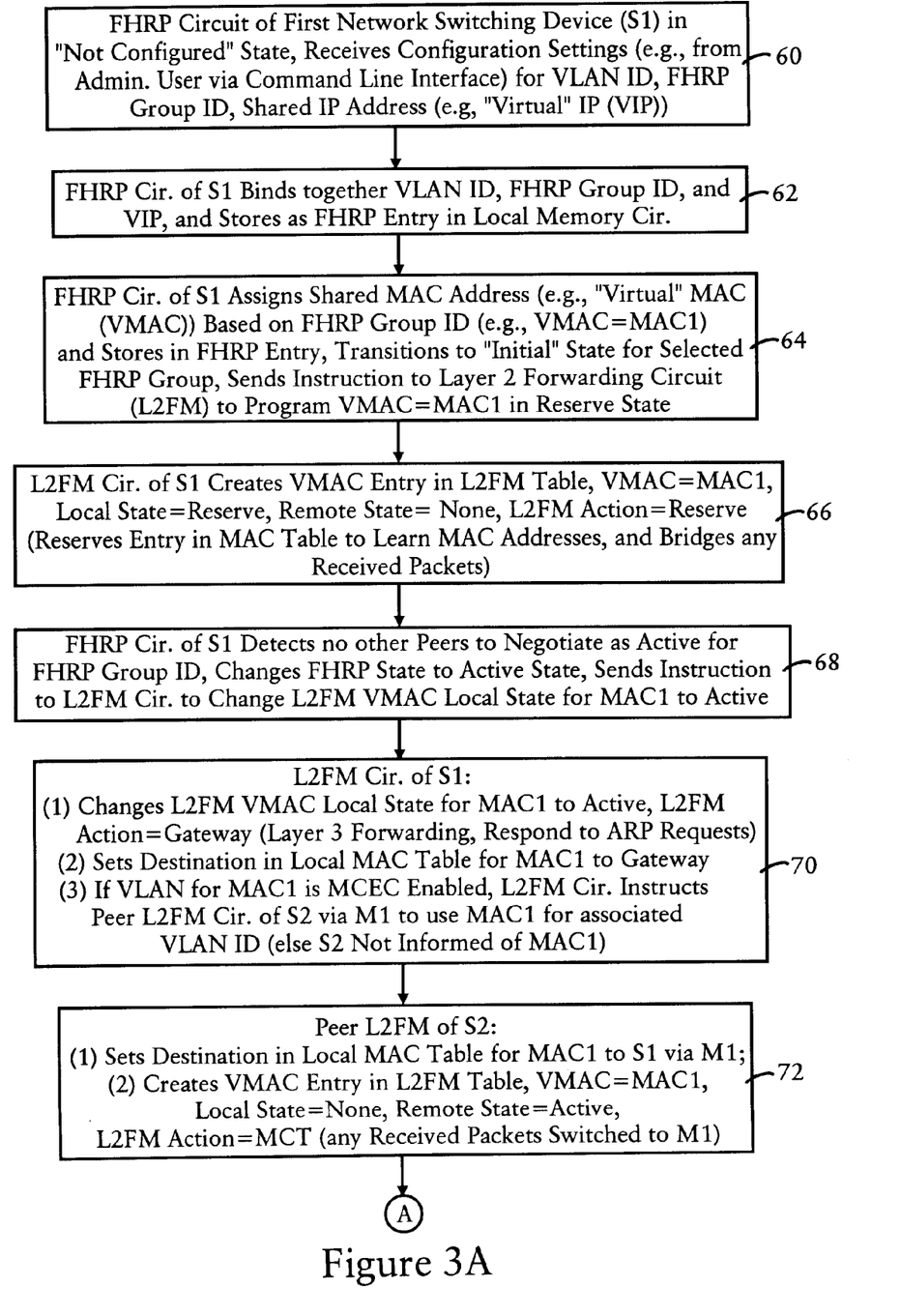
FIGS. 3A and 3B summarize a method by the network switching devices of FIG. 1 of implementing the distributed IP gateway based on concurrently sharing a shared IP address and a shared MAC address, according to an example embodiment.
Figure 3B:
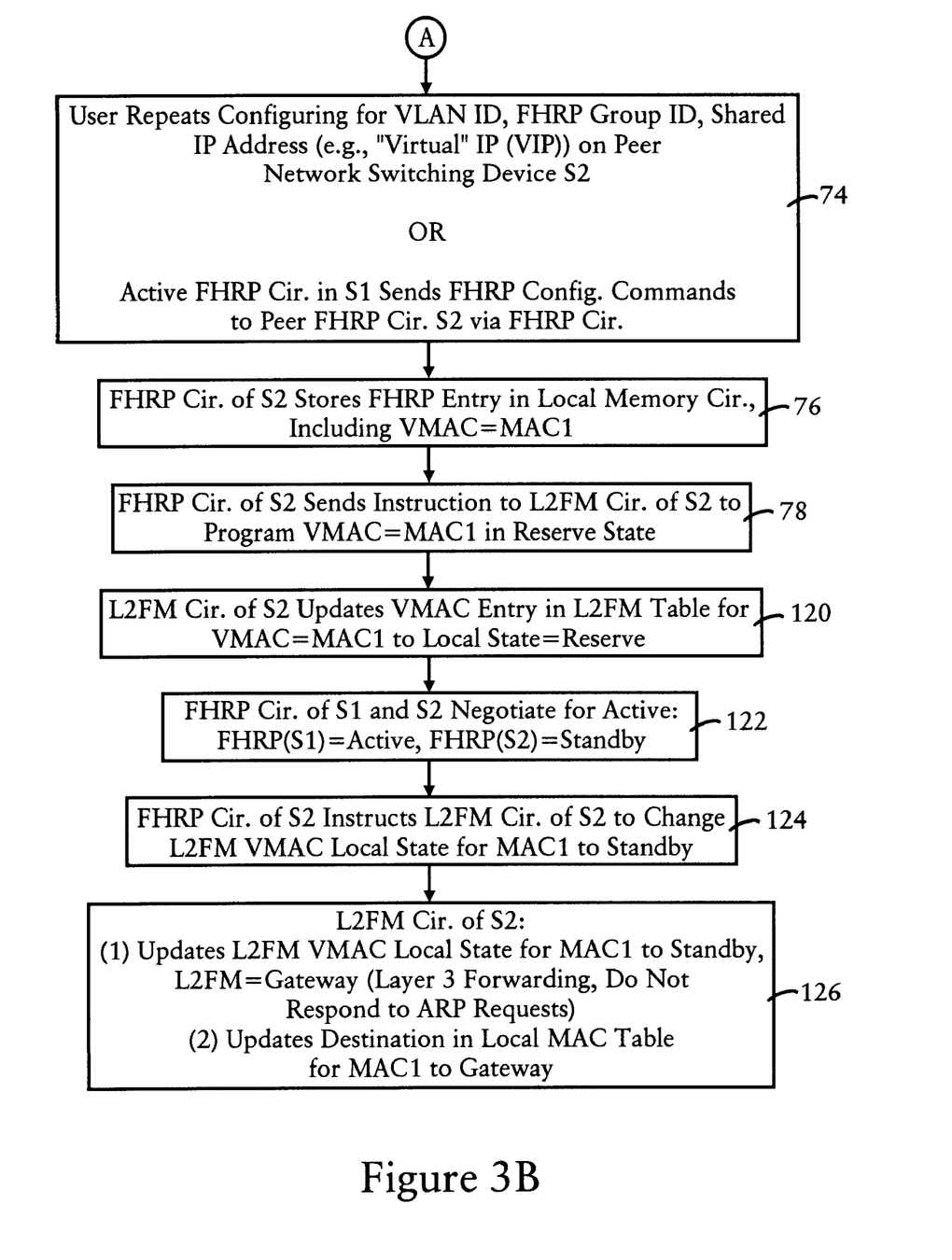

FIGS. 3A and 3B summarize a method by the network switching devices of FIG. 1 of implementing the distributed IP gateway based on concurrently sharing a shared IP address 32 and a shared MAC address 30, according to an example embodiment. The steps described in FIGS. 3A and 3B and FIG. 6 can be implemented as machine-executable code stored on a computer or machine readable storage medium (e.g., floppy disk, hard disk, ROM, EEPROM, nonvolatile RAM, CD-ROM, etc.) that are completed based on execution of the code by a processor circuit; the steps described herein also can be implemented as executable logic that is encoded in one or more tangible media for execution (e.g., programmable logic arrays or devices, field programmable gate arrays, programmable array logic, application specific integrated circuits, etc.).

Referring to FIG. 3A, the FHRP circuit 36 of the first network switching device "S1" (and the second network switching device "S2" as described below) 12 is initially in a "Not Configured" state, where the FHRP table 44b is empty of any FHRP entry 46 defining FHRP parameters necessary for executing layer 3 forwarding as part of gateway redundancy. As described below with respect to the peer network switching device "S2" 12, if one network switching device (e.g., "S1") 12 is in an Active FHRP state and the peer network switching device (e.g., "S2") 12 is in either a "Not Configured" state or an "Initial" state (indicating the peer network switching device is incapable of layer 3 forwarding), the peer network switching device can be configured to forward all data packets via the peer data link "M1" 16 to the active network switching device (e.g., "S1") for layer 3 forwarding. As described below, the peer network switching device "S2" 12 also can be configured to forward all data packets via the peer data link "M1" 16 to be active network switching device "S1" 12 if the peer network switching device "S2" detects other events that prevent layer 3 forwarding (e.g., a detected failure of the link "U2", a detected failure of the FHRP circuit 36 in the peer network switching device "S2", etc.).

The distributed gateway protocol circuit (also referred to as the "FHRP circuit") 36 can receive in step 60 configuration settings for a VLAN identifier value 80, an FHRP group identifier value 82 and a shared IP address value 32, also referred to as a "virtual" IP (VIP) address value 32 (e.g., the VIP address "1.1.1.1" 32). The configuration settings can be received by the FHRP circuit 36 for example based on an administrative user having access to the network switching device 12 by a command line interface data link; the configuration settings also can be received via a data connection 22 by another configuring device.

The configuration settings include a VLAN identifier value 80, an FHRP group identifier value 82, and a shared IP address value 32. The configuration settings provide the necessary parameters performing layer 3 gateway redundancy according to the protocol being implemented (e.g., HSRP, VRRP, or GLBP). Hence, the configuration settings define a logical interface (also referred to as a "virtual interface") based on the FHRP circuit 36 binding in step 62 the prescribed VLAN identifier 80 (identified as capable of supporting vPC connections or multi-chassis Ether Channel (MCEC) connections) to an FHRP group identifier value 82 and a shared IP address value 32. An example command line interface (CLI) input by a user can include the command "(config) # interface vlan 100 (mcec)" that causes the FHRP circuit 36 to define the vPC or MCEC-capable interface identified as the VLAN identifier "vlan 100" 80, followed by the CLI input "(config-if)# hsrp 1" that causes the FHRP circuit 36 to define in step 62 the FHRP group identifier "hsrp 1" 82 assigned to the VLAN identifier "vlan 100" according to the HSRP protocol, followed by the CLI input "(config-if-hsrp)# ip address 1.1.1.1" that causes the FHRP circuit 36 to bind the shared IP address "1.1.1.1" 32 to the VLAN interface "vlan 100" 80. In this example, the FHRP group identifier "hsrp1" serves as a group identifier for the distributed IP gateway 14 of FIG. 1, where "hsrp" indicates that the distributed IP gateway 14 is implemented according to HSRP protocol, for example as described in RFC 2281.

Hence, the FHRP circuit 36 is configured for binding together in step 62 the VLAN ID "100" 80, the FHRP group ID "hrsp1" 82, and the shared IP address "1.1.1.1" 32, and storing the bound configuration parameters as an FHRP entry 46a in the local memory circuit 44b. FIG. 2 illustrates the table entry 46a that binds the logical interface identified by the VLAN identifier "100" 80 with the FHRP group identifier "hsrp1" 82 and the shared IP address "VIP1=1.1.1.1" 32; the FHRP circuit 36 also can store in the VLAN table 44e a VLAN entry 54a specifying that the VLAN ID "100" 80 is capable of supporting vPC or MCEC.

Figure 7A:
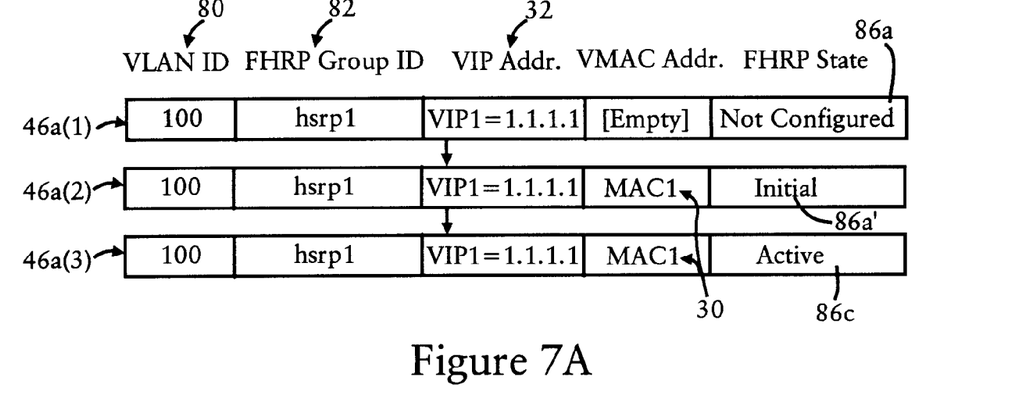
FIGS. 7A and 7B illustrate a sequence in a first network switching device of updating an FHRP table entry, and an L2FM table entry, respectively, according to an example embodiment.

FIG. 7A illustrates a sequence of updating the FHRP table entry 46a by the FHRP circuit 36 in the network switching device "S1" 12, where the table entry 46a(1) illustrates the initial table entry 46a stored by the FHRP circuit 36 in step 62. Hence, the table entry 46a(1) initially binds the logical interface identified by the VLAN identifier "100" 80 with the FHRP group identifier "hsrp 1" 82 and the shared IP address "VIP1=1.1.1.1". The table entry 46a(1) also specifies an FHRP state of "Not Configured" 86a, described below, because the FHRP circuit 36 has not yet assigned a shared MAC address 88 to the HSRP group defining the distributed IP gateway 14.

The FHRP circuit 36 in the network switching device "S1" 12 is configured for responding to the storage of the new entry 46a(1) that defines the distributed IP gateway 14 by assigning and binding in step 64 of FIG. 3A a shared MAC address 88 (illustrated as "MAC1" 30) to the shared IP address 32 and FHRP group identifier 82 in the FHRP entry 46a, and storing the shared MAC address 88 in the FHRP entry 46a. In addition, the FHRP circuit 36 chooses the shared MAC address 30 based on the FHRP group identifier 82, providing a prescribed correlation between the shared MAC address 82 and the group identifier 82. The FHRP circuit 36 in the network switching device "S1" 12 also responds to the storage of the shared MAC address 30 by transitioning in step 64 from the "Not Configured" FHRP state 86a to the "Initial" FHRP state 86a', illustrated in FIG. 7A as the FHRP entry 46a(2).

The FHRP circuit 36 is configured for responding to the transition in step 64 to the "Initial" state for the selected FHRP group "hsrp 1", by sending in step 64 the shared MAC address "MAC1" 30 to the layer 2 forwarding circuit 38 with an instruction 100a (illustrated in FIG. 4) to program the shared MAC address "MAC1" 30 in a Reserve state 90. The relationship between the FHRP circuit states, the L2FM states, and the L2FM forwarding actions will be described with respect to FIGS. 4 and 5.

Figure 4:
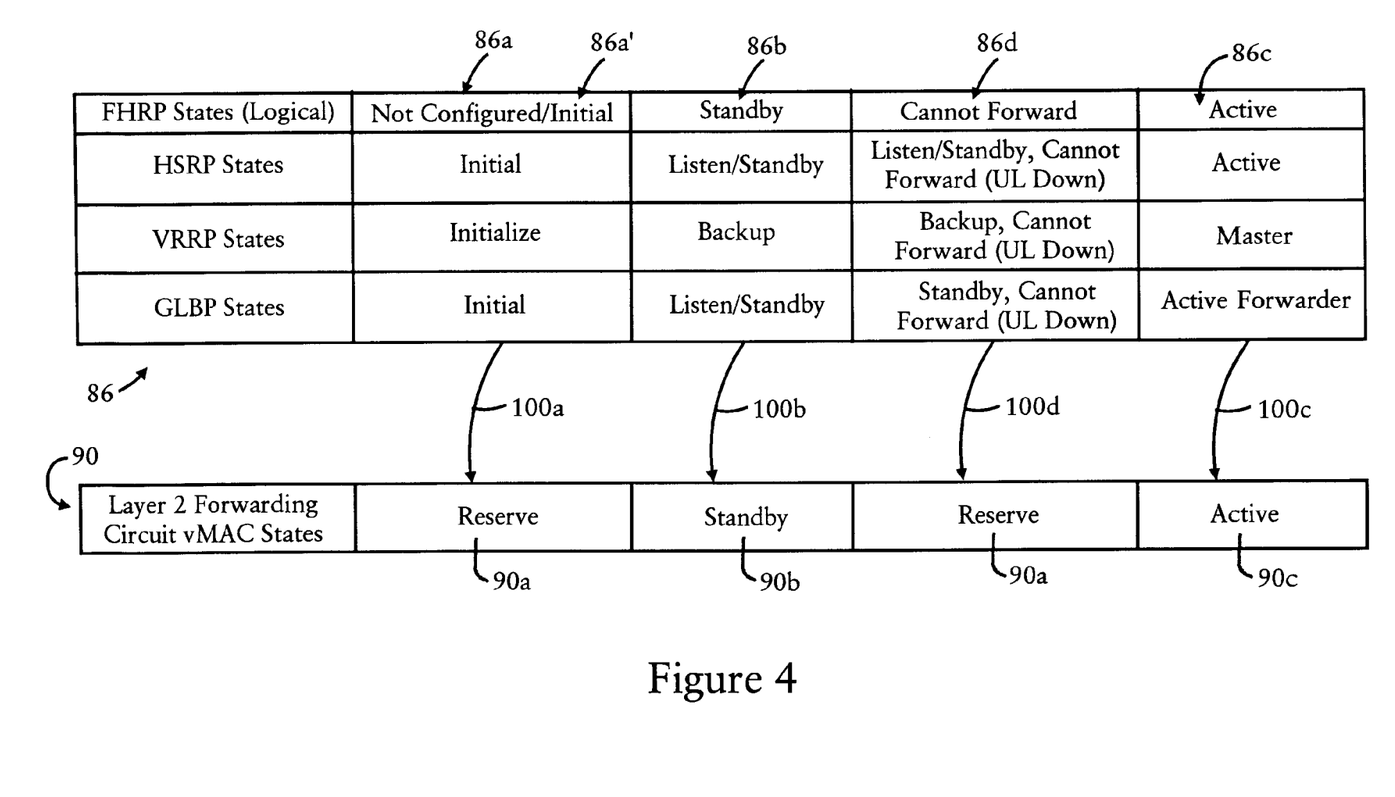
FIG. 4 illustrates example mappings from a layer 3-based FHRP circuit state to a layer 2-based layer 2 forwarding circuit state in a network switching device, according to an example embodiment.

FIG. 4 illustrates example mappings from the layer 3-based FHRP circuit states 86 to local layer 2-based forwarding circuit states 90, according to an example embodiment. In particular, a transition to the logical FHRP state of "Not Configured" 86a or "Initial" 86a' causes the distributed gateway protocol circuit 36 to send an instruction 100a to the L2FM circuit 38 that the L2FM circuit 38 should be set to the "Reserve" state 90a for the specified VMAC address 88. The logical FHRP state "Not Configured/Initial" 86a is illustrated by "Initial" or "Initialize" states according to HSRP, VRRP, and/or GLBP protocol.

A transition by the distributed gateway protocol circuit 36 to the logical FHRP state of "Standby" 86b is illustrated by "Listen" or "Standby" states in HSRP or GLBP protocol, or a "Backup" state according to VRRP protocol. The "Standby" logical state 86b represents the state in which a network switching device 12 has negotiated with another peer network switching device 12, where the peer network switching device 12 has claimed the "Active" state 86c and the network switching device 12 acquiesces into adopting the subordinate "Standby" state. The "Active" state 86c is illustrated by an "Active" state according to HSRP protocol, a "Master" state according to VRRP protocol, or an "Active Forwarder" state according to GLBP protocol.

Hence, a transition by the distributed gateway protocol circuit 36 to the "Standby" state 86b causes the distributed gateway protocol circuit 36 to output a command 100b specifying that the state executed by the L2FM circuit 38 for the corresponding shared MAC address 88 should be set to a "Standby" state 90b; a transition by the distributed gateway protocol circuit 36 to the "Active" state 86c causes the distributed gateway protocol circuit 36 to output a command 100c specifying that the state executed by the L2FM circuit 38 for the corresponding shared MAC address 88 should be set to an "Active" state 90c.

If the distributed gateway protocol circuit 36 detects a failure condition 86d, for example the network switching device "S1" 12 is unable to send data packets to the layer 3 gateway device 26 via the uplink (U1) or the network switching device "S2" is unable to send data packets via the uplink "U2", the distributed gateway protocol circuit 36 can transition to the "Cannot Forward" logical state 86d and send the corresponding instruction 100d specifying that a state executed by the L2FM circuit 38 for the corresponding shared MAC address 88 should be set to a "Reserve" state 90a.

Figure 5:
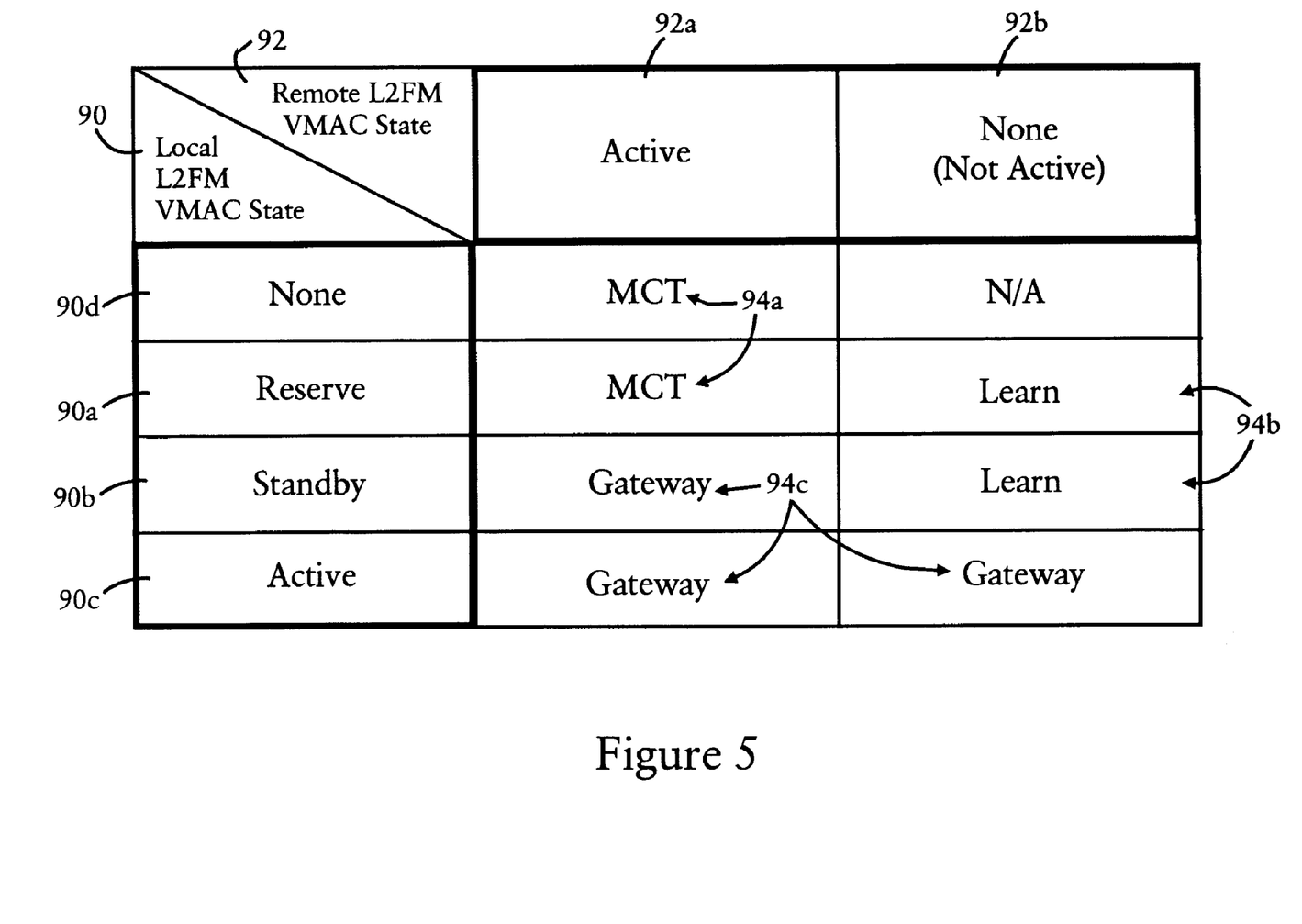
FIG. 5 illustrates an example layer 2 forwarding circuit execution based on respective shared MAC address states between the local and remote layer 2 forwarding circuits, according to an example embodiment.

FIG. 5 illustrates layer 2 forwarding actions 94 by the L2FM circuit 38 based on the respective shared MAC address states 90 in the local L2FM circuit 38 (e.g., in the network switching device "S1") relative to the shared MAC address states 92 in the remote L2FM circuit 38 (e.g., in the network switching device "S2"). The remote state "Active" 92a indicates that the peer network switching device 12 is active according to the relevant FHRP protocol, and the remote state "None" 92b indicates that the peer network switching device 12 is not active according to the relevant FHRP protocol. Hence, the local L2FM circuit 38 determines the layer 2 forwarding action 94 that needs to be executed based on the relative local state 90 and remote state 92 for the shared MAC address 88.

For example, if the local state 90 for the L2FM circuit 38 (e.g., in "S1") is "None" 90d (i.e., has not been configured with any shared MAC address) and the remote state for the peer L2FM circuit 38 (e.g., in "S2") is "Active", then the layer 2 forwarding action is a vPC Trunk transfer or multichannel trunk transfer, referred to generally as "MCT" 94a. The MCT forwarding action 94a causes the L2FM circuit 38 to program the corresponding MAC entry 104 of the MAC table 44d pointing to the relevant shared MAC address (e.g., "MAC1" 30), if available, to specify that all layer 2 packets addressed to the relevant shared MAC address (e.g., "MAC1" 30) should be output on the network switch port circuit ("Port 1") 42 providing the peer link "M1" 16 to the peer network switching device 12. Hence, a local state of "None" 90d (indicating the local L2FM circuit 38 is not yet configured with a shared MAC address 88) and a remote state of "Active" 92a causes the local L2FM circuit 38 forward data packets to the active peer via the peer link 16.

FIGS. 4 and 5 also illustrate that the MCT forwarding action 94a can be executed by the L2FM circuit 38 in response to the local "Reserve" state 90a caused by an Initial FHRP state 86a', or a detected failure state 86d, while the remote L2FM circuit 38 is in an "Active" state 92a. Hence, failover mechanisms can be initiated based on detecting that the remote state of the L2FM circuit 38 is an active state 92a.

If the local L2FM state is "Reserve" 90a or "Standby" 90b and the remote state 92 of the peer layer 2 forwarding circuit 38 is "None" 92b, the layer 2 forwarding action is set to "Learn" 94b. The Learn action 94b causes the L2FM circuit 38 to set an "always learn" bit for the corresponding MAC entry 104, causing the received packet to be bridged on any available network switch port circuit 42 since there is no Active network switching device 12 for the distributed IP gateway 14.

If the local L2FM state is "Standby" 90b and the remote state 92 of the peer layer 2 forwarding circuit 38 is "Active" 92a, or if the local L2FM state is "Active" 90c, the layer 2 forwarding action is set to "Gateway" 94c. The Gateway action 94c causes the L2FM circuit 38 to set a "Gateway flag" (G/W) in the corresponding MAC entry 104 for the specified shared MAC address (e.g., MAC1 30), causing any received packet addressed to the shared MAC address (e.g., MAC1 30) to be forwarded to the layer 3 gateway circuit 34 for layer 3 forwarding. If the local state is set to Active 90c, then the layer 3 gateway circuit 34 can both execute layer 3 forwarding and also can respond to Layer 2/Layer 3 Address Resolution Protocol (ARP) requests; if the local state is set to Standby 90b and the forwarding action is set to Gateway 94c, the layer 3 gateway circuit 34 can execute layer 3 forwarding but cannot respond to ARP requests.

Hence, the L2FM circuit 38 can respond to instructions 100 from the distributed gateway protocol circuit 36, and respond to status updates and/or instructions received from the peer L2FM circuit 38 via the peer link 16, in order to determine the layer 2 forwarding action 94 that should be executed for the relevant shared MAC address (e.g., MAC1 30).

Referring to step 66 of FIG. 3A, the L2FM circuit 38 of the network switching device "S1" 12 is configured for responding in step 66 to the instruction from the FHRP circuit 36 that was sent in step 64 to program the specified shared MAC address 30 to a Reserve state 90a. In particular, the L2FM circuit 38 creates in step 66 a layer 2 state table entry (also referred to as a "VMAC" entry) 48a in the L2FM table 44c and that specifies the shared MAC address 30 and corresponding local state ("Reserve") 90a of the layer 2 forwarding circuit 38 for the shared MAC address 30. The L2FM circuit 38 in "S1" also adds in step 66 to the layer 2 state table entry 48a the corresponding remote state 92 for the peer layer 2 forwarding circuit 38 within "S2" 12 for the shared MAC address 30. The L2FM circuit 38 initially sets the remote state to "None" 92b. The L2FM circuit 38 in "S1" also adds in step 66 to the layer 2 state table entry 48a a layer 2 forwarding action ("Learn") 94b that identifies a corresponding execution state of the L2FM circuit 38 for the shared MAC address 30. The L2FM circuit 38 also adds the layer 2 forwarding action 94 as a hardware MAC table command, enabling the L2FM circuit 38 to program each EEPROM 44*f* of each network switch port circuit 42 to execute the corresponding action specified in the command 94.

Figure 7B:
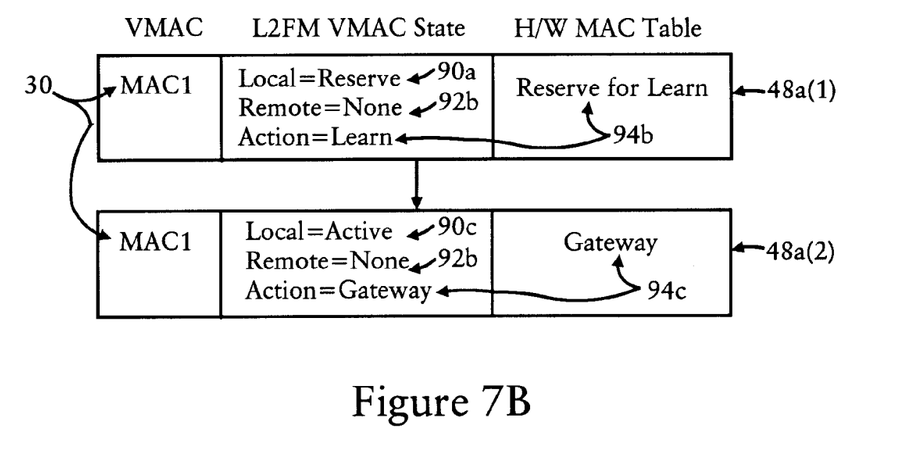

FIG. 7B illustrates the layer 2 state table entry 48*a*(1) that is stored by the L2FM circuit 38 upon completion of step 66. The layer 2 state table entry 48*a*(1) stores the local state 90 as "Reserve" 90*a*, the remote state 92 as "None" 92*b*, and the layer 2 forwarding action 94 as "Learn" 94*b*, with the hardware MAC table command 94 specifying "Reserve for Learn". Hence, the L2FM circuit 38 programs each of the network switch port circuits 42 (via their respective EEPROMs) to execute the "Reserve for Learn" command, according to the hardware-specific requirements of the network switch port circuits 42, resulting in bridging of the received packet.

The distributed gateway protocol circuit 36 of the network switching device "S1" 12 detects in step 68 that no other peers are available to negotiate to serve as an active gateway for the FHRP group ID "hsrp1" 82 according to be prescribed FHRP protocol (e.g., HSRP). Hence, the distributed gateway protocol circuit 36 in step 68 claims active control of the distributed IP gateway 14 defined by the FHRP entry 46*a*. In particular, the distributed gateway protocol circuit 36 in step 68 updates the FHRP entry 46*a* by changing the FHRP state 86 for the shared MAC address "MAC1" 30 to the Active state 86*c*, illustrated in FIG. 7A as the entry 46*a*(3). The distributed gateway protocol circuit 36 also sends in step 68 an instruction 100*c*, illustrated in FIG. 4, in response to the state transition to notify the L2FM circuit 38 to change the local state 90 for the shared MAC address "MAC1" 30 to the active state 90*c*.

In response to receiving the instruction 100*c* in step 70, the L2FM circuit 38 changes in step 70 the local state for the L2FM circuit 38 for the shared MAC address "MAC1" 30 in the layer 2 state table entry 48*a* to an active state 90*c*, and then updates the layer 2 forwarding action 94 to specify the Gateway action 94*c*, as illustrated in FIG. 7B by the updated layer 2 state table entry 48*a*(2). As described previously, the L2FM circuit 30 responds in step 70 to the Gateway action 94*c* by setting the destination value in the local layer 2 forwarding table 44*d* for the shared MAC address "MAC1" 30 to specify the gateway flag "G/W", causing any data packets received by any network switch port circuit 42 and addressed to the shared MAC address "MAC1" 30 to be forwarded to the layer 3 gateway circuit 34.

The L2FM circuit 38 also checks in step 70 if the identified layer 2 VLAN group 80 for the shared MAC address "MAC1" 30 is configured for vPC or MCEC connections, for example based on accessing the corresponding entry 54*a* of the VLAN table 44*e*. In response to determining that the corresponding VLAN 80 for the shared MAC address "MAC1" 30 is enabled for vPC or MCEC connections, the L2FM circuit 38 sends in step 70 an instruction via the peer data link 16 to the peer L2FM circuit 38 of the peer network switching device 12. The instruction sent from the L2FM circuit 38 of "S1" to the peer L2FM circuit 38 of "S2" specifies the shared MAC address "MAC1" 30 for the distributed IP gateway 14 and instructs the peer L2FM circuit 38 to use the shared MAC address "MAC1" 30 for the associated VLAN identifier "100".

The peer L2FM circuit 38 in the peer network switching device "S2" 12 receives in step 72 the instruction from the L2FM circuit 38 of the active network switching device "S1" 12. The instruction can specify the shared MAC address "MAC1" 30 and optionally an identifier that identifies the distributed IP gateway 14, for example the VLAN identifier 80, FHRP group identifier 82, and/or shared IP address 32.

Figure 8A:
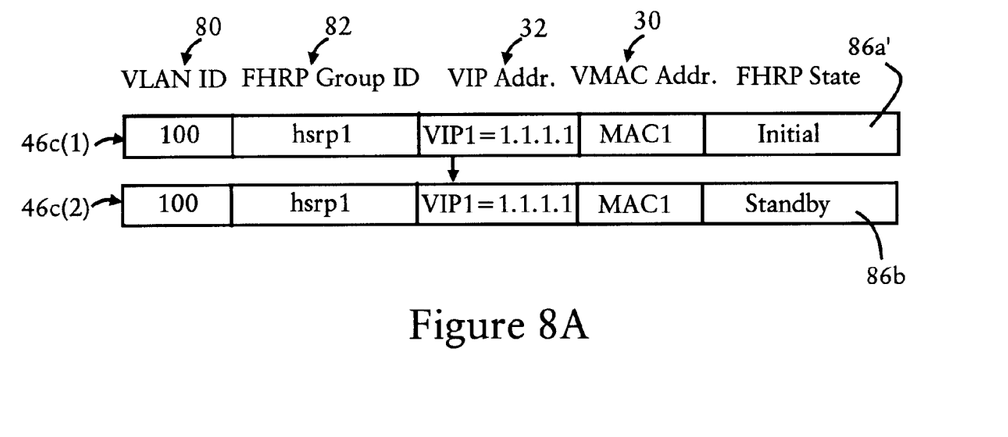
FIGS. 8A and 8B illustrate a sequence in a second network switching device, acting as a peer of the first network switching device, of updating the corresponding FHRP table entry, and the corresponding L2FM table entry, respectively, according to an example embodiment.
Figure 8B:
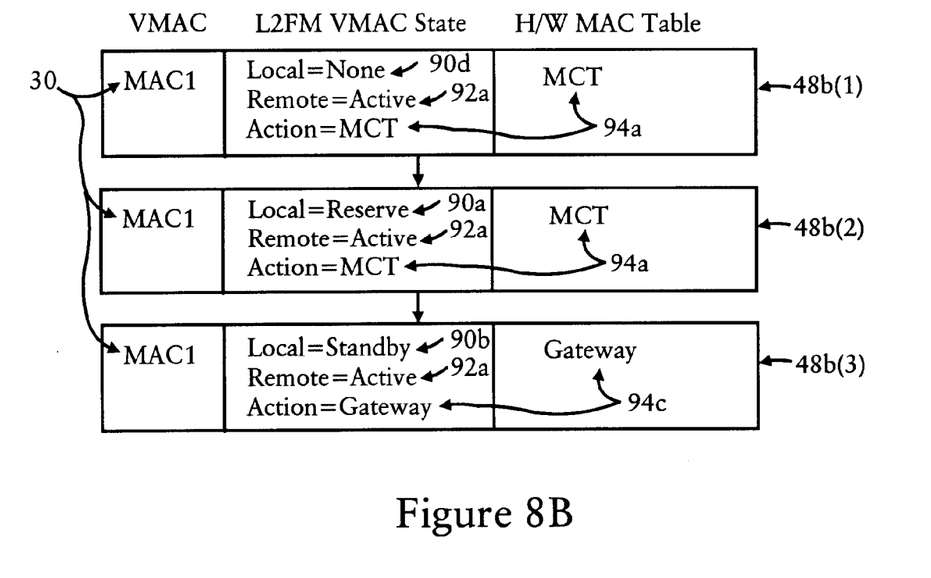

Assuming in step 72 that the instruction specifies only the shared MAC address "MAC1" 30 and that the peer network switching device "S2" 12 has not yet been configured for distributed gateway processing (as in step 60 and 62 for "S1"), the peer L2FM circuit 38 in "S2" creates in step 72 a new peer layer 2 state table entry 48*b*(1), illustrated in FIG. 8B, that specifies the shared MAC address 30, the corresponding local state 90*d*, the remote state 90*c* of the L2FM circuit 38 in the active network switching device "S1" 12, and the layer 2 forwarding action 94*a*. Hence, the peer L2FM circuit 38 in the peer network switching device "S2" 12 configures each of its network switch port circuits 42 to switch packets addressed to the shared MAC address 30 to the active network switching device "S1" 12 via the peer data link 16.

Referring to FIG. 3B, assume in step 74 that a user repeats the configuration of the peer network switching device "S2" 12 as in step 60 of FIG. 3A; alternately, assume in step 74 that the instruction sent by the L2FM circuit 38 of the active network switching device "S1" 12 specifies the necessary FHRP configuration commands including the VLAN ID 80, the FHRP group ID 82, the shared IP address 32, and the shared MAC address 88, at which point the L2FM circuit 38 in the peer network switching device "S2" 12 can forward the FHRP configuration commands to its distributed gateway protocol circuit 36. Hence, the distributed gateway protocol circuit 36 in "S2" receives in step 74 the FHRP configuration commands and the shared MAC address 88, and in response creates in step 76 an FHRP entry 46*c*, entry 46*c*(1) in FIG. 8A.

In response to transitioning to the Initial state 86*a*', the distributed gateway protocol circuit 36 of "S2" sends in step 78 an instruction to the instruction 100*a* to its L2FM circuit 38 to update the corresponding local state 90 to the Reserve state 90*a*. The L2FM circuit 38 in "S2" updates in step 120 the peer layer 2 state table entry 48*b*, illustrated as 48*b*(2) in FIG. 8B, to specify the Reserve state 90*a* and the corresponding layer 2 forwarding action "MCT" 94*a*. Hence, the network switching device "S2" 12 continues to forward packets addressed to the shared MAC address "MAC1" to the active network switching device "S1" 12 via the peer link "M1" 16.

Assume now in step 122 that the FHRP circuits 36 in both network switching devices 12 negotiate to identify an active switch according to the prescribed FHRP protocol (e.g., HSRP). In response to the FHRP circuits 36 concluding that "S1" is claiming active control of the distributed IP gateway 14 and "S2" becomes a subordinate standby switching device, the FHRP circuit 36 of the standby network switching device "S2" updates its FHRP entry 46 to specify the standby state 86*b* as illustrated by the entry 46*c*(2) of FIG. 8A, sends in step 124 an instruction 100*b* for its L2FM circuit 38 to change the layer 2 state table entry 48*b* to a standby state 90*b*. The L2FM circuit 38 in "S2" in response updates in step 126 the local state to Standby 90*b*, and updates the layer 2 forwarding action to Gateway 94*c* as illustrated in the layer 2 state table entry 48*b*(3) of FIG. 8B.

Hence, the network switching device "S1" 12 claims active control of the distributed IP gateway 14 in Active FHRP state 86*c*, whereas the network switching device "S2" 12 operates as part of the distributed IP gateway 14 in Standby FHRP state 86*b*, based on both network switching devices "S1" and "S2" 12 concurrently using both the shared MAC address ("MAC1") 30 and the shared IP address ("1.1.1.1") 32.

According to the example embodiments, network switching devices 12 can establish a distributed IP gateway 14 according to existing FHRP-based protocols (e.g., HSRP, VRRP, GLBP) based on a shared IP address 32, while concurrently implementing the distributed IP gateway 14 using vPC or MCEC connections 18 based on a shared MAC address 30. Hence, the FHRP-based distributed IP gateway 30 can be implemented using vPC or MCEC connections 18. Further, both the Active network switching device (e.g., "S1") 12 and the Stand by network switching device (e.g., "S2") 12 in the distributed IP gateway 14 can execute layer 3 forwarding of data packets to a Layer 3 destination (e.g., the layer 3 gateway router device 26), minimizing the transfer of data traffic between the network switching devices 12 via the peer link 16. Consequently, if a given layer 2 access switch device (e.g., "Ac1") 20 implements load balancing across its connected data links "L1" and "L2", the network switch devices "S1" and "S2" can forward the data traffic received from the access switch device "Ac1" 20 to the layer 3 gateway device 26 via the respective uplinks "U1" and "U2", minimizing the necessity of transferring data traffic via the peer link "M1" 16.

Figure 6:
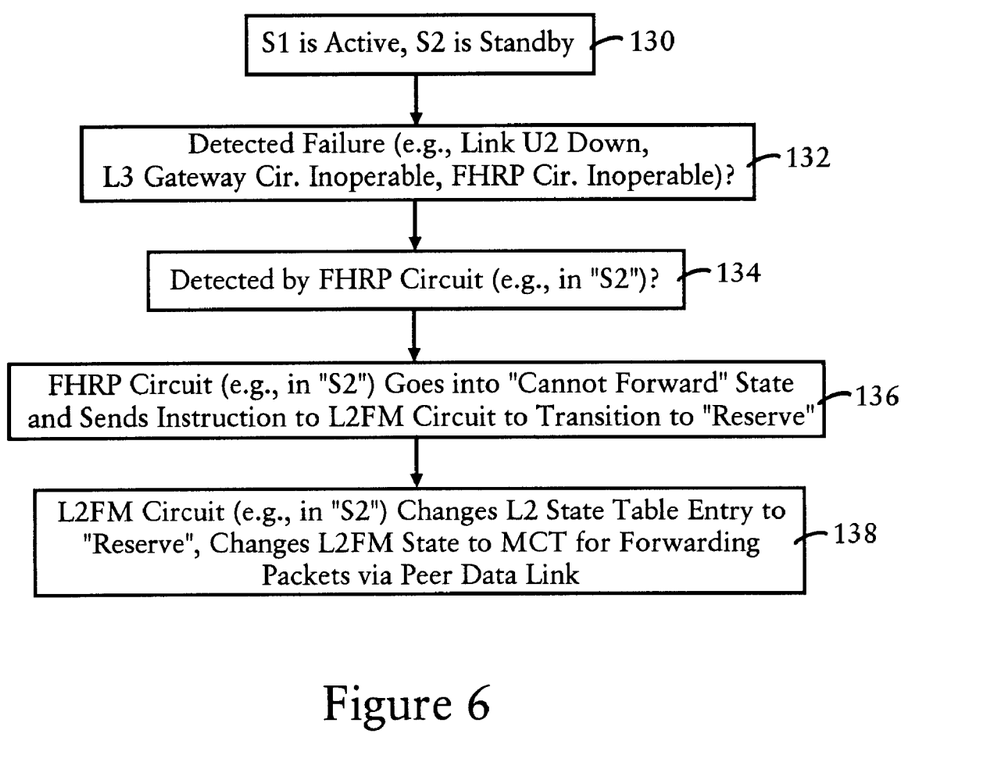
FIG. 6 illustrates example steps executed by the network switching device in response to a detected failure condition.

The network switching devices "S1" and "S2" also synchronize any changes in state information, ensuring that data loss due to a detected failure is minimized. For example, FIG. 6 illustrates an example failover operation that minimizes data loss. Assume in step 130 the FHRP circuit 36 of the network switching device "S2" 12 is in a Standby state 86b, as illustrated by the FHRP table entry 46c(2) of FIG. 8A, and the FHRP circuit 36 of the network switching device "S1" 12 is in an Active state 86c, as illustrated by the FHRP table entry 46a(3) of FIG. 7A.

Assume in step 132 that the FHRP circuit 36 and/or the L2FM circuit 38 of the network switching device "S2" 12 detects a failure or an inability to forward data packets to the connected gateway device 26 via the uplink U2 22. For example, the failure or inability can be detected by the FHRP circuit 36 in step 134 or by the L2FM circuit 38 in step 138. The detected failure or inability by the FHRP circuit 36 and/or the L2FM circuit 38 can be determined based on various threshold parameters, for example the relative reliability of the uplink U2 (e.g., based on bit error rate, link speed, etc.), FHRP priority, and/or tracking state of the object associated with the FHRP group, etc.

If the failure is detected by the FHRP circuit 36 of "S2" in step 134, the FHRP circuit 36 in step 136 updates the corresponding FHRP table entry 46c(2) of FIG. 8A to a "Cannot Forward" state 86d, and sends an instruction 100d to its local L2FM circuit 38 to transition to the "Reserve" state 90a. The local L2FM circuit 38 of changes in step 138 the layer 2 state table entry 48b(3) to specify a local reserve state 90a, and a layer 2 forwarding action of "MCT" 94a. The layer 2 forwarding action "MCT" 94a causes the local L2FM circuit 38 of "S2" to update the corresponding MAC forwarding table entry 104 to forward all received packets addressed to the shared MAC address 30 to the peer data link 16 for transfer to the Active network switching device 12. As apparent from the foregoing, the Standby state can be resumed once the above-identified parameters have been resolved to within prescribed threshold values (e.g., improved reliability of the uplink U2, FHRP priority, and/or tracking state of the object associated with the FHRP group, etc.), whereby the FHRP circuit 36 enters the Standby state 86b and supplies the appropriate command 100b to the L2FM circuit 38.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    assigning, by a distributed gateway protocol circuit in a first network switching device, a shared Media Access Control (MAC) address to a shared Internet Protocol (IP) address, the shared MAC address and the shared IP address being configured to enable connected network devices to reach a distributed IP gateway in a network, the distributed IP gateway comprising at least two network switching devices operating concurrently with each other, the concurrent operation based on enabling a combined use of first hop redundancy protocols (FHRP) and multiple data link channels in the at least two network switching devices;
    claiming, with the distributed gateway protocol circuit in the first network switching device, active control over the distributed IP gateway; and
    sending, by a layer 2 forwarding circuit in the first network switching device, an instruction via a peer data link to a peer layer 2 forwarding circuit in a second network switching device in response to the distributed gateway protocol circuit in the first network switching device claiming active control of the distributed IP gateway and based on determining the shared MAC address is assigned to a layer 2 virtual large area network (VLAN) group that is configured for multichannel link layer communications, the instruction enabling the second network switching device to operate concurrently with the first network switching device as part of the distributed IP gateway based on concurrent use of the shared MAC address and the shared IP address by the first network switching device and the second network switching device.

2. The method of claim 1, wherein:
    the assigning includes binding the shared MAC address and the shared IP address with a group identifier for the distributed IP gateway, and sending the shared MAC address to the layer 2 forwarding circuit;
    the method further comprises the layer 2 forwarding circuit responding to the shared MAC address from the distributed gateway protocol circuit by creating a layer 2 state table entry to specify the shared MAC address, a corresponding local state of the layer 2 forwarding circuit for the shared MAC address, a corresponding remote state of the peer layer 2 forwarding circuit for the shared MAC address, and a layer 2 forwarding action identifying a corresponding execution state of the layer 2 forwarding circuit for the shared MAC address.

3. The method of claim 2, wherein the responding includes setting the local state for the shared MAC address to reserve an entry in a layer 2 forwarding table in the first network switching device for MAC address learning, and setting the remote state to specify the second network switching device does not claim active control of the distributed IP gateway.

4. The method of claim 3, further comprising:
    in response to the distributed gateway control circuit claiming the active control of the distributed IP gateway, sending a second instruction to the layer 2 forwarding circuit to change the local state for the shared MAC address to an active state;
    the sending of the instruction by the layer 2 forwarding circuit including:
    changing the local state for the shared MAC address to the active state in response to the second instruction, and
    changing the layer 2 forwarding action to specify the execution state for the shared MAC address as executing a prescribed layer 3 gateway operation, the layer 2 forwarding circuit sending the instruction to the peer layer 2 forwarding circuit in response to the local state for the shared MAC address being changed to the active state.

5. The method of claim 4, further comprising the layer 2 forwarding circuit executing the prescribed layer 3 gateway operation based on causing each network switch port circuit of the first network switching device to forward a received packet, destined for the shared MAC address, to a prescribed layer 3 gateway circuit in the first network switching device.

6. The method of claim 2, further comprising:
the peer layer 2 forwarding circuit implementing the instruction based on creating a peer layer 2 state table entry for the shared MAC address in the second network switching device, the peer layer 2 state table entry specifying the shared MAC address, the corresponding state of the peer layer 2 forwarding circuit as one of forwarding received packets to the first network switching device via the peer data link or forwarding the received packets to a prescribed layer 3 gateway device;
the peer layer 2 forwarding circuit selectively setting the corresponding state of the peer layer 2 forwarding circuit based on a determined status of the second network switching device relative to the shared MAC address.

7. The method of claim 6, further comprising:
the second network switching device receiving a packet addressed to the shared MAC address from one of the connected network devices while the first network switching device claims the active control; and
the second network switching device executing layer 3 forwarding of the packet to a connected gateway device while the first network switching device claims the active control, based on the peer layer 2 forwarding circuit determining the status of the second network switching device relative to the shared MAC address as having a standby state relative to the distributed IP gateway.

8. The method of claim 7, further comprising:
the second network switching device determining an inability to forward the packet to the connected gateway device, the peer layer 2 forwarding circuit in response updating the corresponding state of the peer layer 2 forwarding circuit as forwarding received packets to the first network switching device via the peer data link.

9. An apparatus comprising:
a distributed gateway protocol circuit configured for:
assigning a shared Media Access Control (MAC) address to a shared Internet Protocol (IP) address, the shared MAC address and the shared IP address being configured to enable connected network devices to reach a distributed IP gateway in a network, the distributed gateway protocol circuit configured for selectively claiming active control of the distributed IP gateway, the distributed IP gateway comprising at least two network switching devices operating concurrently with each other, the concurrent operation based on enabling a combined use of first hop redundancy protocols (FHRP) and multiple data link channels in the at least two network switching devices, and
claiming active control over the distributed IP gateway;
one or more network interface circuits having a plurality of network switch port circuits, each network switch port circuit configured for establishing a corresponding data link with one of the connected network devices or a connected network switching device; and
a layer 2 forwarding circuit configured for sending an instruction to the connected network switching device via the corresponding data link in response to the distributed gateway protocol circuit in the first network switching device claiming the active control of the distributed IP gateway and based on determining the shared MAC address is assigned to a layer 2 virtual large area network (VLAN) group that is configured for multichannel link layer communications, the instruction enabling the connected network switching device to operate concurrently with the apparatus as part of the distributed IP gateway based on concurrent use of the shared MAC address and the shared IP address by the apparatus and the connected network switching device.

10. The apparatus of claim 9, further comprising a memory circuit, wherein:
the distributed gateway protocol circuit is configured for binding the shared MAC address and the shared IP address with a group identifier for the distributed IP gateway, and sending the shared MAC address to the layer 2 forwarding circuit;
the layer 2 forwarding circuit configured for responding to the shared MAC address from the distributed gateway protocol circuit by creating in the memory circuit a layer 2 state table entry to specify the shared MAC address, a corresponding local state of the layer 2 forwarding circuit for the shared MAC address, a corresponding remote state of the peer layer 2 forwarding circuit for the shared MAC address, and a layer 2 forwarding action identifying a corresponding execution state of the layer 2 forwarding circuit for the shared MAC address.

11. The apparatus of claim 10, wherein the layer 2 forwarding circuit is configured for setting the local state for the shared MAC address to reserve an entry in a layer 2 forwarding table in the memory circuit for MAC address learning, and setting the remote state to specify the connected network switching device does not claim active control of the distributed IP gateway.

12. The apparatus of claim 11, wherein:
the distributed gateway control circuit is configured for claiming the active control of the distributed IP gateway based on a prescribed protocol, and in response sending a second instruction to the layer 2 forwarding circuit to change the local state for the shared MAC address to an active state;
the layer 2 forwarding circuit further configured for:
changing the local state for the shared MAC address to the active state in response to the second instruction, and
changing the layer 2 forwarding action to specify the execution state for the shared MAC address as executing a prescribed layer 3 gateway operation, and
sending the instruction to the peer layer 2 forwarding circuit in response to the local state for the shared MAC address being changed to the active state.

13. The apparatus of claim 12, further comprising a prescribed layer 3 gateway circuit, wherein the layer 2 forwarding circuit executing the prescribed layer 3 gateway operation based on causing each network switch port circuit to forward a received packet, destined for the shared MAC address, to the prescribed layer 3 gateway circuit.

14. An apparatus comprising:
means for assigning a shared Media Access Control (MAC) address to a shared Internet Protocol (IP) address, the shared MAC address and the shared IP address being configured to enable connected network devices to reach a distributed IP gateway in a network, the means for assigning configured for selectively claiming active control of the distributed IP gateway, the distributed IP gateway comprising at least two network switching devices operating concurrently with each other, the concurrent operation based on enabling a combined use of first hop redundancy protocols (FHRP) and multiple data link channels in the at least two network switching devices;

means for claiming active control over the distributed IP gateway;

one or more network interface circuits having a plurality of network ports, each network port configured for establishing a corresponding data link with one of the connected network devices or a connected network switching device;

and means for sending an instruction to the connected network switching device via the corresponding data link in response to the means for claiming the active control of the distributed IP gateway and based on determining the shared MAC address is assigned to a layer 2 virtual large area network (VLAN) group that is configured for multichannel link layer communications, the instruction enabling the connected network switching device to operate concurrently with the apparatus as part of the distributed IP gateway based on concurrent use of the shared MAC address and the shared IP address by the apparatus and the connected network switching device.

15. An apparatus comprising:
a distributed gateway protocol circuit configured for:
establishing a distributed IP gateway with a connected network switching device according to a prescribed protocol, the distributed IP gateway having a shared Media Access Control (MAC) address and a shared Internet Protocol (IP) address that is configured to enable network devices connected to the apparatus to reach the distributed IP gateway in a network, the distributed gateway protocol circuit configured for selectively claiming active control of the distributed IP gateway according to a prescribed protocol, the distributed IP gateway comprising at least two network switching devices operating concurrently with each other, the concurrent operation based on enabling a combined use of first hop redundancy protocols (FHRP) and multiple data link channels in the at least two network switching devices, and
claiming active control over the distributed IP gateway;
one or more network interface circuits having a plurality of network switch port circuits, each network switch port circuit configured for establishing a corresponding data link with one of the connected network devices or a connected network switching device; and
a layer 2 forwarding circuit configured for receiving an instruction from the connected network switching device via the corresponding data link, the instruction specifying the shared MAC address to be used for reaching the distributed IP gateway based on the connected network switching device having claimed the active control of the distributed IP gateway and based on determining the shared MAC address is assigned to a layer 2 virtual large area network (VLAN) group that is configured for multichannel link layer communications, the instruction enabling the apparatus to operate concurrently with the connected network switching device as part of the distributed IP gateway based on concurrent use of the shared MAC address and the shared IP address by the apparatus and the connected network switching device.

16. The apparatus of claim 15, wherein the layer 2 forwarding circuit is configured for forwarding a received packet to a prescribed IP gateway in response to the received packet specifying the shared MAC address and based on the layer 2 forwarding circuit detecting the apparatus operating in a standby state relative to the distributed IP gateway.

17. The apparatus of claim 16, wherein the layer 2 forwarding circuit is configured for forwarding the received packet to the connected network switching device in response to determined unavailability of the apparatus reaching the prescribed IP gateway.

18. The method of claim 1, wherein claiming active control over the distributed IP gateway occurs before assigning the shared MAC address to the shared IP address.

19. The method of claim 1, wherein claiming active control over the distributed IP gateway occurs concurrently with assigning the shared MAC address to the shared IP address.

20. The method of claim 1, wherein claiming active control over the distributed IP gateway occurs subsequent to assigning the shared MAC address to the shared IP address.

21. The method of claim 1, wherein the enabling of the combined use of the FHRP and the multiple data link channels is achieved by the first network switching device sending an instruction via a peer data link to the second network switching device specifying the shared MAC address and configuring a multichannel link layer communication by assigning the shared MAC address to the layer 2 VLAN group.

22. The method of claim 1, wherein the combined use of the FHRP and the multiple data link channels is characterized by the second network switching device configured to perform layer 3 forwarding and receiving of data packets while in a standby state or a listen state.

23. The method of claim 1, wherein the FHRP comprises one of:
Hot Standby Router Protocol (HSRP),
Virtual Router Redundancy Protocol (VRRRP), and
Gateway Load-Balancing Protocol (GLBP).

* * * * *